(12) United States Patent
Wang

(10) Patent No.: US 8,662,466 B2
(45) Date of Patent: Mar. 4, 2014

(54) MULTI-FUNCTIONAL MOBILE LAPTOP DESK

(75) Inventor: Jianguo Wang, Dongguan (CN)

(73) Assignee: Dongguan Maichi Electric Appliance Co., Limited, Dongguan, Guangdong (CN)

( * ) Notice: Subject to any disclaimer, the term of this patent is extended or adjusted under 35 U.S.C. 154(b) by 78 days.

(21) Appl. No.: 13/377,565

(22) PCT Filed: May 31, 2010

(86) PCT No.: PCT/CN2010/073390
§ 371 (c)(1),
(2), (4) Date: Dec. 11, 2011

(87) PCT Pub. No.: WO2010/142209
PCT Pub. Date: Dec. 16, 2010

(65) Prior Publication Data
US 2012/0255389 A1      Oct. 11, 2012

(30) Foreign Application Priority Data

Jun. 12, 2009   (CN) .......................... 2009 1 0040200

(51) Int. Cl.
*F16M 13/00*   (2006.01)
(52) U.S. Cl.
USPC ........... 248/422; 248/158; 248/160; 248/407; 248/418; 248/423

(58) Field of Classification Search
USPC ......... 248/917, 923, 422, 423, 407, 408, 158, 248/160, 418, 276.1, 280.11
See application file for complete search history.

(56) References Cited

U.S. PATENT DOCUMENTS

| 7,429,716 B2 * | 9/2008 | Bong et al. .................. 219/125.1 |
| 8,359,982 B2 * | 1/2013 | Lebel et al. ..................... 108/44 |
| 2013/0157501 A1 * | 6/2013 | Ishii et al. ..................... 439/527 |

* cited by examiner

*Primary Examiner* — Amy J Sterling
(74) *Attorney, Agent, or Firm* — Jackson IPG PLLC

(57) ABSTRACT

A multi-functional mobile laptop desk includes a base, on which a support member is set; the end of the support member far from the base is provided with a joint, the top of the joint is provided with a first upper arm, and the lower part of the joint is provided with a first A lower arm and a first B lower arm paralleling with the first upper arm; the end of the first upper arm far from the joint is connected with the top of a tooth tank; the ends of the first A lower arm and the first B lower arm far from the joint are connected with the lower part of the tooth tank; the top of the another end of the tooth tank is provided with a second upper arm, and the lower part of the end is provided with a second A lower arm and a second B lower arm paralleling with the second upper arm; the another end of the second upper arm far from the tooth tank is connected with the top of a connecting seat; the another ends of the second A lower arm and the second B lower arm far from the tooth tank are connected with the lower part of the connecting seat; the front of the connecting seat far from the tooth tank is provided with a moveable computer seat.

4 Claims, 3 Drawing Sheets

MULTI-FUNCTIONAL MOBILE LAPTOP DESK

TECHNICAL FIELD OF THE INVENTION

The invention relates to a piece of furniture, and particularly to a mobile laptop desk convenient for the placement of a laptop.

BACKGROUND OF THE INVENTION

The laptop has the advantages of smallness, elegant appearance, easy carrying, powerful functions or the like, and is more widely used in business, household and other fields. In the prior art, the computer desk basically adopts a traditional design, i.e. the desk legs are stressed at four corners, or two lateral parts are supported by lateral plates, and the desk top has a standard height. Once the laptop desk is assembled, it cannot be readjusted. The height is always the same and cannot be changed according to individuals, different users must adapt to the same desk.

When people use the laptop at home, in the hotel and other places, in order to use the laptop more conveniently and comfortably, many people like to use lying in bed. There are usually two ways of using the laptop lying in bed. One way is that a small desk is placed on the bed, and the laptop is placed on the small desk during use. When the small desk is placed on the bed, the user may kick down the small desk due to carelessness, or because the small desk occupies a certain space, the user is not so convenient and comfortable to use the desk. The other way is that the user directly places the laptop on his legs for operation. This way has relatively obvious defects. Firstly, the laptop gets hot after a specified period of use, if the laptop is used for a long period of time, the user's legs may be burnt or the use may be affected. Secondly, due to insufficient security, the user is likely to drop the laptop on the group due to carelessness, thereby damaging the laptop, which brings unnecessary troubles to the user.

SUMMARY OF THE INVENTION

In view of the problems existing in the prior art, the invention provides a multi-functional mobile laptop desk which has the advantages of simple and rational structure and convenient use to overcome the defects of the above prior art. As the laptop desk is novel in structure, simple and practical, and convenient for production, it is greatly applicable to different people, thereby providing a more reasonable and comfortable way to use the laptop.

To this end, the multi-functional mobile laptop desk of the invention adopts the following technical schemes:

A multi-functional mobile laptop desk includes a base, on which a support member is set; the end of the support member far from the base is provided with a joint, the top of the joint is provided with a first upper arm, and the lower part of the joint is provided with a first A lower arm and a first B lower arm paralleling with the first upper arm; the another end of the first upper arm far from the joint is connected with the top of a tooth tank; the another ends of the first A lower arm and the first B lower arm far from the joint are connected with the lower part of the tooth tank; the top of the another end of the tooth tank is provided with a second upper arm, and the lower part of the another end of the tooth tank is provided with a second A lower arm and a second B lower arm paralleling with the second upper arm; the another end of the second upper arm far from the tooth tank is connected with the top of a connecting seat; the another ends of the second A lower arm and the second B lower arm far from the tooth tank are connected with the lower part of the connecting seat; the front of the connecting seat far from the tooth tank is provided with a moveable computer seat.

A C locating sensor is arranged in the tooth tank; the C locating sensor is electrically connected with a motor; the motor drives a three-stage reduction gear; the three-stage reduction gear drives a locating gear; the two sides of the locating gear are respectively provided with an A locating sensor and a B locating sensor, which are electrically connected with the motor; the three-stage reduction gear drives a gear disk; a plurality of locating holes are arranged on the gear disk near an outer edge; the outer side of the gear disk is provided with one-way locking teeth; locking pins are arranged above the locating holes.

Further, a mouse table is arranged below the connecting seat; the middle parts of the first A lower arm and the first B lower arm are respectively provided with springs; the another ends of the springs are connected with the joint; the middle parts of the second A lower arm and the second B lower arm are respectively provided with the springs; the another ends of the springs are connected with the tooth tank.

By using humanized design, the invention is convenient to use, simple in structure, easy to produce, convenient for operation, flexible and convenient to use. Due to using a floor type base and a unilateral support member, the height of the table top of the moveable computer seat can be conveniently adjusted as required. Casters can be also installed under the base so as to move the desk more conveniently. Further, the desk top can be arranged by the bedside to meet the use requirements of different people. The multi-functional mobile laptop desk can be conveniently fixed on the bed head and on the wall or other places, so the user can randomly adjust the position of the laptop desk according to his own need when using the desk.

DETAILED DESCRIPTION OF THE INVENTION

Figure 1:
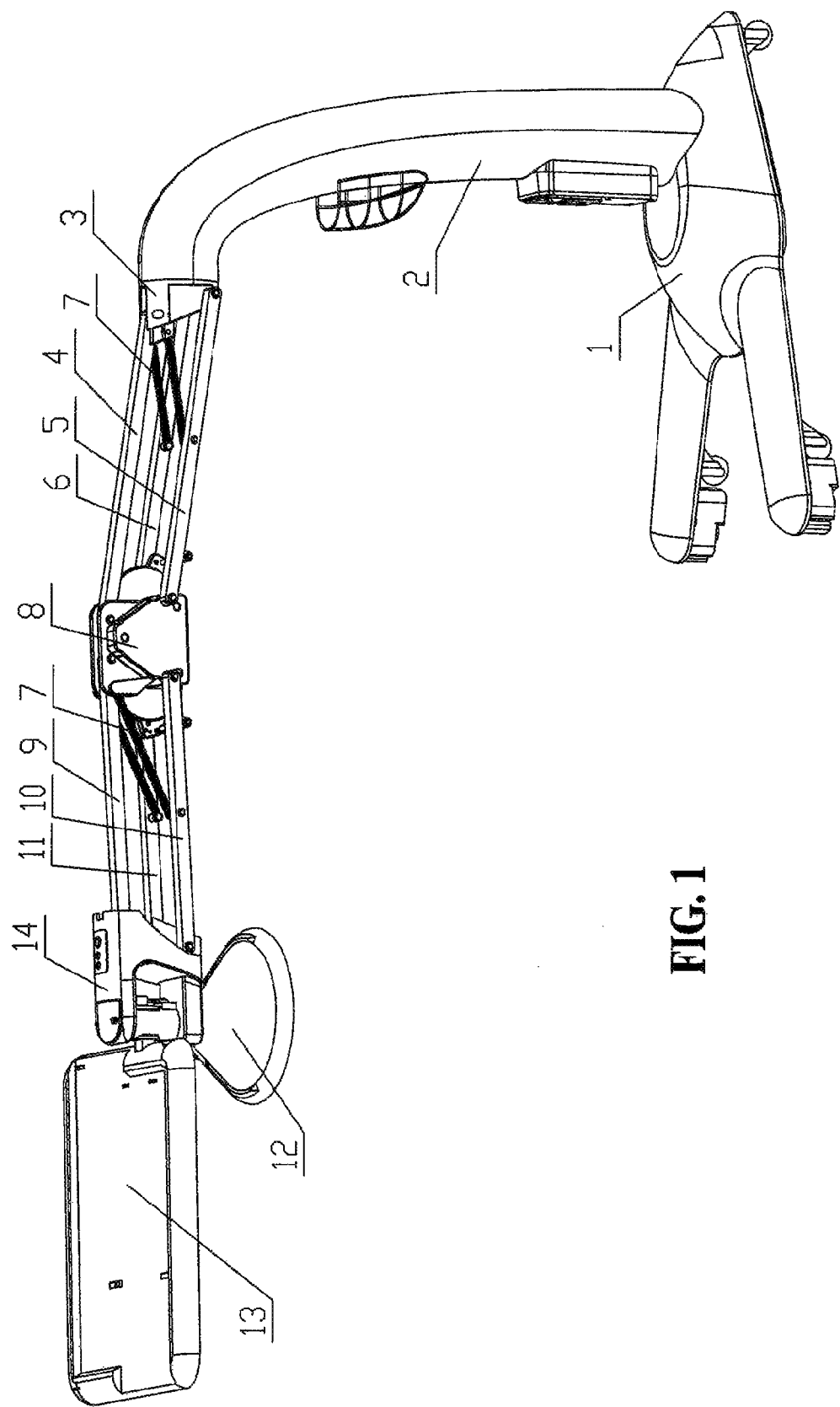
FIG. 1 is a structure diagram of the embodiment of the invention.

To further understand the features, technical means and achieved specific purposes and functions of the invention, the advantages and spirit of the invention are analyzed, and the details of the invention are further understood in conjunction with the accompanying drawings and specific implementation modes.

The structure related to the invention mainly includes the following parts (or devices): a base 1, a support member 2, a joint 3, a first upper arm 4, a first A lower arm 5, a first B lower arm 6, springs 7, a tooth tank 8, a second upper arm 9, a second A lower arm 10, a second B lower arm 11, a mouse table 12, a moveable computer seat 13, a connecting seat 14, a motor 15, a C locating sensor 16, locating holes 17, locking pins 18, a three-stage reduction gear 19, locking teeth 20, a gear disk 21, an A locating sensor 22, a locating gear 23 and a B locating sensor 24.

The structural devices are as shown in FIG. 1; FIG. 1 is a structure diagram of the embodiment of the multi-functional mobile laptop desk of the invention.

Figure 2:
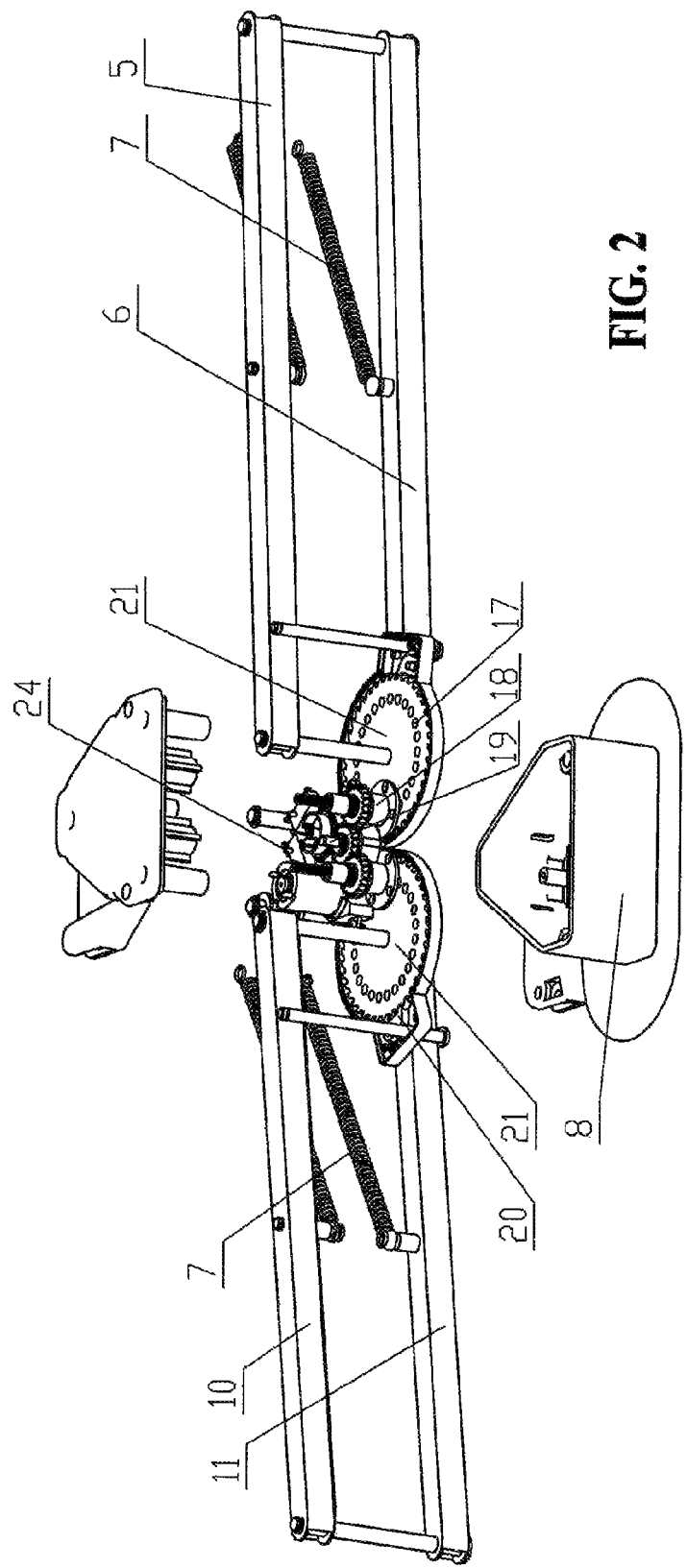
FIG. 2 is a diagram of a connecting rod part of the embodiment of the invention.
Figure 3:
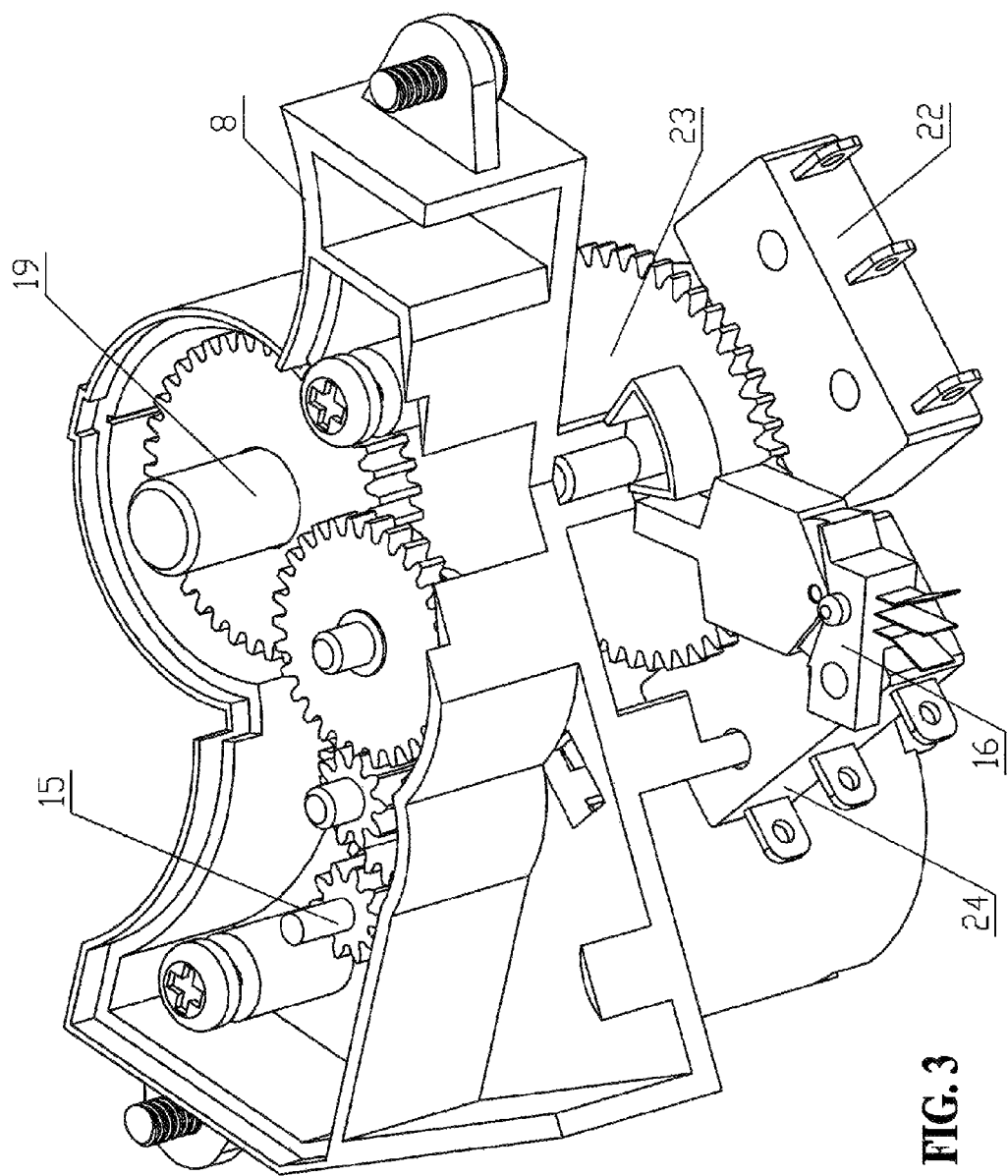
FIG. 3 is a diagram of a tooth tank part of the embodiment of the invention.

FIG. 2 and FIG. 3 illustrate the specific details of the embodiment of the invention.

FIG. 2 is a structure diagram of a connecting rod part of the embodiment of the invention; and FIG. 3 is a structure diagram of a tooth tank part of the embodiment of the invention.

The multi-functional mobile laptop desk includes a base 1, on which a support member 2 is set; the end of the support member 2 far from the base 1 is provided with a joint 3, the top of the joint 3 is provided with a first upper arm 4, and the lower part of the joint 3 is provided with a first A lower arm 5 and a first B lower arm 6 paralleling with the first upper arm 4; the middle parts of the first A lower arm 5 and the first B lower arm 6 are respectively provided with springs 7; the another ends of the springs 7 are connected with the joint 3; the another end of the first upper arm 4 far from the joint 3 is connected with the top of a tooth tank 8; the another ends of the first A lower arm 5 and the first B lower arm 6 far from the joint 3 are connected with the lower part of the tooth tank 8; the top of the another end of the tooth tank 8 is provided with a second upper arm 9, and the lower part of the another end of the tooth tank 8 is provided with a second A lower arm 10 and a second B lower arm 11 paralleling with the second upper arm 9; the middle parts of the second A lower arm 10 and the second B lower arm 11 are respectively provided with the springs 7; the another ends of the springs 7 are connected with the tooth tank 8; the another end of the second upper arm 9 far from the tooth tank 8 is connected with the top of a connecting seat 14; the another ends of the second A lower arm 10 and the second B lower arm 11 far from the tooth tank 8 are connected with the lower part of the connecting seat 14; the front of the connecting seat 14 far from the tooth tank 8 is provided with a moveable computer seat 13; a mouse table 12 is arranged below the connecting seat 14; a C locating sensor 16 is arranged in the tooth tank 8; the C locating sensor 16 is electrically connected with a motor 15; the motor 15 drives a three-stage reduction gear 19; the three-stage reduction gear 19 drives a locating gear 23; the two sides of the locating gear 23 are respectively provided with an A locating sensor 22 and a B locating sensor 24, which are electrically connected with the motor 15; the motor 15 can be controlled by the A locating sensor 22 and the B locating sensor 24 dually; the motor 15 also can be controlled by the C locating sensor 16 individually; the three-stage reduction gear 19 drives a gear disk 21; a plurality of locating holes 17 are arranged on the gear disk 21 near an outer edge; the outer side of the gear disk 21 is provided with one-way locking teeth 20; locking pins 18 are arranged above the locating holes 17.

When used, the C locating sensor 16 judges whether the whole machine is locked or unlocked. When the whole machine is unlocked, the first upper arm 4, the first A lower arm 5 and the first B lower arm 6 take the joint 3 as a rotating shaft, so that the tooth tank 8 connected with the another ends of the first upper arm 4; the first A lower arm 5 and the first B lower arm 6 can rotate circularly around the joint 3 by taking the joint 3 as the center; the another end of the tooth tank 8 is connected with the connecting seat 14 through the second upper arm 9, the second A lower arm 10 and the second B lower arm 11; the connecting seat 14 can rotate circularly around the tooth tank 8 by taking the tooth tank 8 as the center.

The locking teeth 20 and locating gear 23 in the tooth tank 8 can control the rotation of the first upper arm 4, the first A lower arm 5 and the first B lower arm 6 connected with the end of the tooth tank 8, and the rotation of the second upper arm 9, the second A lower arm 10 and the second B lower arm 11 connected with the another end of the tooth tank 8; the locating holes 17, the locking pins 18 and the gear disk 21 in the tooth tank 8 are used for locking and locating each arm; the A locating sensor 22, the B locating sensor 24 and the C locating sensor 16 can control the rotation of the motor 15 and each gear when unlocked.

The connecting seat 14 rotates by taking the tooth tank 8 as the center, so that the connecting seat 14 can perform bent arm remote control relative to the joint 3; the connecting seat 14 and joint 3 are displaced by an expansion distance, and simultaneously, the horizontal stability of the connecting seat 14 itself can be ensured; the moveable computer seat 13 connected with the connecting seat 14 and the support member 2 connected with the joint 3 are displaced by an expansion distance; after the moveable computer seat 13 is stretched and adjusted to the most suitable spatial position within a permitted range, the motor 15 in the tooth tank 8 drives the three-stage reduction gear 19; the three-stage reduction gear 19 drives the locking pins 18 to be inserted into the plurality of locating holes 17 on the gear disk 21; as the whole machine is locked, the user can randomly adjust the position of the laptop desk according to his own need when using the desk.

What is claimed is:

1. A multi-functional mobile laptop desk, including: a base (1), on which a support member (2) is set, wherein the end of the support member (2) far from the base (1) is provided with a joint (3), the top of the joint (3) is provided with a first upper arm (4), and the lower part of the joint (3) is provided with a first A lower arm (5) and a first B lower arm (6) paralleling with the first upper arm (4); the another end of the first upper arm (4) far from the joint (3) is connected with the top of a tooth tank (8); the another ends of the first A lower arm (5) and the first B lower arm (6) far from the joint (3) are connected with the lower part of the tooth tank (8); the top of the another end of the tooth tank (8) is provided with a second upper arm (9), and the lower part of the another end of the tooth tank (8) is provided with a second A lower arm (10) and a second B lower arm (11) paralleling with the second upper arm (9); the another end of the second upper arm (9) far from the tooth tank (8) is connected with the top of a connecting seat (14); the another ends of the second A lower arm (10) and the second B lower arm (11) far from the tooth tank (8) are connected with the lower part of the connecting seat (14); the front of the connecting seat (14) far from the tooth tank (8) is provided with a moveable computer seat (13); a C locating sensor (16) is arranged in the tooth tank (8); the C locating sensor (16) is electrically connected with a motor (15); the motor (15) drives a three-stage reduction gear (19); the three-stage reduction gear (19) drives a locating gear (23); the two sides of the locating gear (23) are respectively provided with an A locating sensor (22) and a B locating sensor (24), which are electrically connected with the motor (15); the three-stage reduction gear (19) drives a gear disk (21); a plurality of locating holes (17) are arranged on the gear disk (21) near an outer edge; the outer side of the gear disk (21) is provided with one-way locking teeth (20); locking pins (18) are arranged above the locating holes (17).

2. The multi-functional mobile laptop desk according to claim 1, wherein the middle parts of the first A lower arm (5) and the first B lower arm (6) are respectively provided with springs (7); the another ends of the springs (7) are connected with the joint (3).

3. The multi-functional mobile laptop desk according to claim 1, wherein the middle parts of the second A lower arm (10) and the second B lower arm (11) are respectively provided with the springs (7); the another ends of the springs (7) are connected with the tooth tank (8).

4. The multi-functional mobile laptop desk according to claim 1, wherein a mouse table (12) is arranged below the connecting seat (14).

\* \* \* \* \*